(12) United States Patent
Wuillaume et al.

(10) Patent No.: US 11,841,519 B2
(45) Date of Patent: *Dec. 12, 2023

(54) WINDOW UNIT HAVING UV REFLECTING COATING WITH HIGH CONTRAST RATIO AT LARGE VIEWING ANGLES FOR REDUCING BIRD COLLISIONS

(71) Applicant: GUARDIAN GLASS, LLC, Auburn Hills, MI (US)

(72) Inventors: Francis Wuillaume, Canton, MI (US); Jian-Gang Weng, Canton, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,556

(22) Filed: Aug. 9, 2021

(65) Prior Publication Data

US 2022/0026611 A1    Jan. 27, 2022

Related U.S. Application Data

(63) Continuation of application No. 16/906,394, filed on Jun. 19, 2020, now Pat. No. 11,092,726.

(51) Int. Cl.
*B32B 15/04* (2006.01)
*B32B 17/06* (2006.01)
*G02B 5/28* (2006.01)
*E06B 3/67* (2006.01)

(52) U.S. Cl.
CPC ............ *G02B 5/283* (2013.01); *E06B 3/6715* (2013.01); *G02B 5/286* (2013.01)

(58) Field of Classification Search
CPC .................................................... G02B 5/283

USPC ........ 428/432, 434, 688, 701, 702, 426, 428
See application file for complete search history.

(56) References Cited

U.S. PATENT DOCUMENTS

| | | |
|---|---|---|
| 3,682,528 A | 8/1972 | Apfel et al. |
| 4,898,790 A | 2/1990 | Finley |
| 4,965,121 A | 10/1990 | Young et al. |
| 5,156,894 A | 10/1992 | Hood et al. |
| 5,306,547 A | 4/1994 | Hood et al. |
| 5,308,662 A | 5/1994 | Woodard et al. |
| 5,514,476 A | 5/1996 | Hartig et al. |
| 5,557,462 A | 9/1996 | Hartig et al. |
| 5,563,734 A | 10/1996 | Wolfe et al. |
| 5,784,853 A | 7/1998 | Hood et al. |
| 5,800,933 A | 9/1998 | Hartig et al. |

(Continued)

OTHER PUBLICATIONS

Refractive index.net Nb2O5, 2023.*

(Continued)

*Primary Examiner* — Lauren R Colgan

(57) ABSTRACT

A window unit is designed to prevent or reduce bird collisions therewith. The window unit may include first and second substrates (e.g., glass substrates) spaced apart from one another, wherein at least one of the substrates supports an ultraviolet (UV) reflecting coating for reflecting UV radiation so that birds are capable of more easily seeing the window. The UV reflecting coating is preferably patterned so that it is not provided across the entirety of the window unit. By making the window more visible to birds, bird collisions and bird deaths can be reduced. The UV reflecting coating is designed to have high UV reflectance across a large range of viewing angles.

17 Claims, 9 Drawing Sheets

(56) References Cited

U.S. PATENT DOCUMENTS

| | | | |
|---|---|---|---|
| 5,837,108 | A | 11/1998 | Lingle et al. |
| 5,902,505 | A | 5/1999 | Finley |
| 5,935,702 | A | 8/1999 | MacQuart et al. |
| 6,014,872 | A | 1/2000 | Hartig et al. |
| 6,030,671 | A | 2/2000 | Yang et al. |
| 6,576,349 | B2 | 6/2003 | Lingle et al. |
| 6,632,491 | B1 | 10/2003 | Thomsen et al. |
| 7,153,579 | B2 | 12/2006 | Kriltz et al. |
| 7,217,461 | B2 | 5/2007 | Ferreira et al. |
| 7,267,879 | B2 | 9/2007 | Thomsen et al. |
| 8,114,488 | B2 | 2/2012 | Alvarez |
| 9,650,290 | B2 * | 5/2017 | Vikor ................ C03C 17/36 |
| 10,526,243 | B2 | 1/2020 | Ridealgh |
| 10,843,961 | B2 * | 11/2020 | Weng ............. B32B 17/10055 |
| 11,092,726 | B1 * | 8/2021 | Wuillaume ............. E06B 3/67 |
| 2001/0031365 | A1 * | 10/2001 | Anderson ........... C03C 17/3435 |
| | | | 428/432 |
| 2008/0008829 | A1 * | 1/2008 | Blacker ............... C03C 17/3618 |
| | | | 427/372.2 |
| 2009/0130349 | A1 | 5/2009 | Alvarez |
| 2009/0263596 | A1 * | 10/2009 | Lao ..................... C03C 17/3618 |
| | | | 428/428 |
| 2015/0345206 | A1 | 12/2015 | Vikor |
| 2018/0066142 | A1 * | 3/2018 | Disteldorf ................ C09D 4/00 |
| 2019/0084874 | A1 * | 3/2019 | Weng ............... B32B 17/10229 |

OTHER PUBLICATIONS

Refractive index.net TiO2, 2023.*

"Too many birds collide with glass", Retrieved from the Internet URL: "http://www.vogelglas.info/public/vogelanprall-ornilux-mikado_ 2012" on Jan. 8, 2023, 1 page.

International preliminary report on patentability received for PCT Application No. PCT/US2021/041014, dated Dec. 29, 2022, 9 pages.

* cited by examiner

Example 3

WINDOW UNIT HAVING UV REFLECTING COATING WITH HIGH CONTRAST RATIO AT LARGE VIEWING ANGLES FOR REDUCING BIRD COLLISIONS

CROSS-REFERENCES TO RELATED APPLICATION

This application is a continuation of application Ser. No. 16/906,394 filed Jun. 19, 2020, the entire content of which is hereby incorporated in this application by reference.

FIELD

This invention relates to a window unit designed to prevent or reduce bird collisions therewith. The window unit may include at least first and second substrates (e.g., glass substrates) spaced apart from one another, wherein at least one of the substrates supports an ultraviolet (UV) reflecting coating for reflecting UV radiation so that birds are capable of more easily seeing the window. The UV reflecting coating is preferably patterned so that it is not provided across the entirety of the window unit. By making the window more visible to birds, bird collisions and bird deaths can be reduced. The provision of the laminated substrates in the window unit is particularly advantageous for bird collision windows, because it can further reduce bird collisions by providing an increased contrast ratio, improve durability, and improve processing.

BACKGROUND OF THE INVENTION

IG window units are known in the art. For example, see U.S. Pat. Nos. 6,632,491, 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

Unfortunately, bird collisions with such windows represent a significant problem. For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration. Birds living in environments such as forests or park areas, with buildings located in such areas, face similar problems associated with flying into the buildings.

Conventional ways of reducing bird collisions with windows include the use of nets, decals, or frit. However, these solutions are considered ineffective because of the aesthetic impact on the architecture and/or because they do not work as they do not make the transparent glass more visible to birds.

U.S. Pat. No. 8,114,488 discloses a window for reducing bird collisions. However, while the window of the '488 patent is effective for preventing/reducing bird collisions, there is room for improvement.

U.S. Pat. No. 9,650,290 discloses an IG window unit for reducing bird collisions, as shown for example in prior art FIG. 1. The IG window unit in FIG. 1 includes first glass substrate 1 and second glass substrate 30 that are spaced apart from one another at least by one or more peripheral seal(s) or spacer(s) 15. The spacer(s) 15, other spacer(s), and/or peripheral seal space the two substrates 1 and 30 apart from one another so that the substrates do not contact one another and so that a space or air gap 17 is defined therebetween. Air gap 17 may or may not be filled with gas such as argon. A solar management coating 19 (e.g., low-E coating) and a UV reflecting coating 150 are provided on the same glass substrate 1. The UV reflecting coating 150 is made up of glass/NbO$_x$/SiO$_x$/NbO$_x$/SiO$_x$/NbO$_x$. The NbO$_x$ may be replaced with TiO$_x$. Unfortunately, it has been found that the UV reflecting coating 150 does not provide particular good contrast ratio to bird (the difference between coated and uncoated areas of the glass) at large viewing angles such as 40-45 degrees. In other words, when a bird approaches the window from an angle (e.g., 40-45 degrees from normal), the bird has a difficult time seeing the difference between the coated and uncoated areas, and thus has a difficult time realizing that a window is present. This leads to a large number of hard bird collisions with windows, and thus significant bird injuries.

In view of the above, it will be appreciated that there exists a need in the art for improved windows which can prevent or reduce bird collisions therewith.

BRIEF SUMMARY OF THE INVENTION

In certain example embodiments of this invention, a window is designed to prevent or reduce bird collisions therewith. In certain example embodiments, the window may comprise an insulating glass (IG) or other type of window unit designed to prevent or reduce bird collisions therewith. The IG window unit includes at least first and second substrates (e.g., glass substrates) spaced apart from one another, wherein at least one of the substrates supports an ultraviolet (UV) reflecting coating for reflecting UV radiation so that birds are capable of more easily seeing the window. A third substrate (e.g., glass substrate) may optionally be provided, and in scenarios where the third substrate is optionally provided at least two of the substrates may be laminated to one another via a polymer-based laminating film. The UV reflecting coating is preferably patterned so that it is not provided across the entirety of the IG window unit. In certain example embodiments of this invention, the UV reflecting coating is designed so as to be more visible to birds at high viewing angles (e.g., 30-45 degrees from normal), so that birds approaching the window at such high angles can more easily see the window and avoid hard window collisions. In other words, the UV reflecting coating is designed to have a high contrast ratio (higher visible difference between coated and uncoated areas of the glass) at such high viewing angles. By making the window more visible to birds at such angles, bird collisions and bird deaths can be reduced. Optionally, when lamination is provided, provision of the laminated substrates in the IG window can further reduce bird collisions by providing an increased contrast ratio, and improved durability. The improved coatings of certain example embodiments of this case may, or may not, be used in conjunction with laminated embodiments herein.

By making the window more visible to birds at high viewing angles (e.g., 30-45 degrees from normal), hard bird collisions and bird deaths can be reduced. The particular UV reflecting coating(s) provided herein, and/or the provision of laminated substrates, is/are particularly advantageous for bird collision windows, because each of these increases the contrast ratio of the IG window unit between areas having the UV reflecting coating and areas not having the UV reflecting coating, with the improved coatings having a significant impact at higher viewing angles, thereby making the window more visible to birds and reducing the likelihood of bird collisions.

In an example embodiment of this invention, there is provided an IG window unit for reducing bird collisions, comprising: a first glass substrate; a second glass substrate; wherein the first glass substrate is provided at an exterior side of the IG window unit so as to face an exterior of a building in which the IG window unit is to be mounted; a patterned UV reflecting coating provided on the first glass substrate and on an exterior surface of the IG window unit so as to face an exterior of a building in which the IG window unit is to be mounted; wherein the UV reflecting coating blocks at least 38% of UV radiation in at least a substantial part of a wavelength range from 330-380 nm; wherein the UV reflecting coating comprises, moving away from the first glass substrate: a first high index transparent dielectric layer; a first low index transparent dielectric layer; a second high index transparent dielectric layer; a second low index transparent dielectric layer; and wherein the IG window unit, as viewed from the exterior thereof, has a UV reflectance of at least 30% at a wavelength of 380 nm for both a viewing angle of 8 degrees and a viewing angle of 45 degrees from normal.

In an example embodiment, there is provided a coated article (e.g., for use in a window unit or spandrel) for reducing bird collisions, comprising: a first glass substrate; a patterned UV reflecting coating provided on the first glass substrate; wherein the UV reflecting coating blocks at least 38% of UV radiation in at least a substantial part of a wavelength range from 330-380 nm; wherein the UV reflecting coating comprises, moving away from the first glass substrate: a first high index transparent dielectric layer; a first low index transparent dielectric layer; a second high index transparent dielectric layer; a second low index transparent dielectric layer; and wherein the coated article, as viewed from an exterior thereof, has a UV reflectance of at least 30% at a wavelength of 380 nm for both a viewing angle of 8 degrees and a viewing angle of 45 degrees from normal.

DETAILED DESCRIPTION OF EXAMPLE EMBODIMENTS OF THE INVENTION

Figure 1:
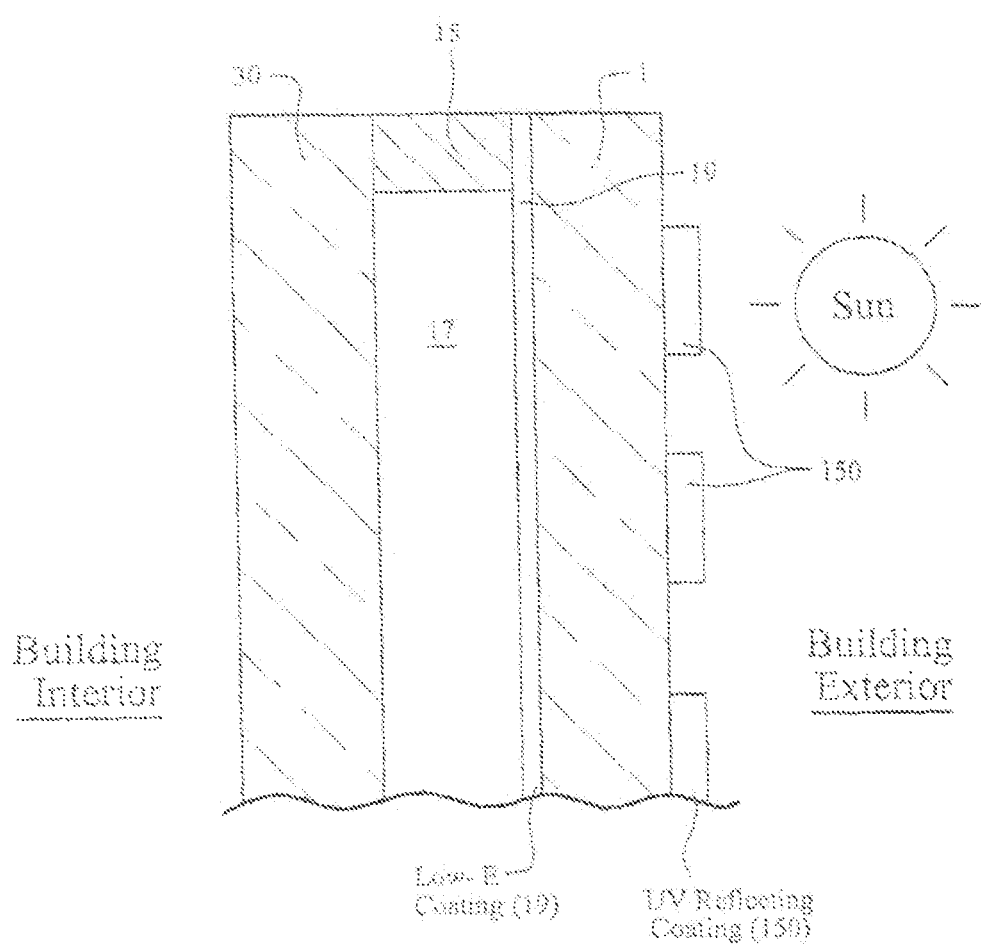
FIG. 1 is a cross sectional view of an IG window unit, which may be used in certain example embodiments of this invention.

Referring now more particularly to the accompanying drawings in which like reference numerals indicate like parts throughout the several views.

The difference between color vision of a bird and human is significant. A bird's visual receptor may be around 370 nm which means that birds can generally see efficiently in the UV range, and in at least a portion of the blue visible range. Using this difference, it is possible to make a coating that efficiently reflects UV (making it visible to birds) while being substantially neutral/invisible to human eyes. Thus, the UV coating may be designed to have essentially the same or a similar reflectance characteristic as bare glass, so as to be substantially invisible to humans.

In certain example embodiments of this invention, a window is designed to prevent or reduce bird collisions therewith. In certain example embodiments, the window may comprise an insulating glass (IG) window unit designed to prevent or reduce bird collisions therewith. The IG window unit includes at least first (any of 1, 30 or 31 in any of FIGS. 1-3) and second (another of 1, 30 or 31 in any of FIGS. 1-3) substrates (e.g., glass substrates) spaced apart from one another, wherein at least one of the substrates supports an ultraviolet (UV) reflecting coating 150 for reflecting UV radiation so that birds are capable of more easily seeing the window. A third (yet another of 1, 30 or 31 in any of FIGS. 2-3) substrate (e.g., glass substrate) may optionally be provided, and in scenarios where the third substrate is optionally provided at least two of the substrates may be laminated to one another via a polymer-based laminating film 200 (e.g., of or including PVB, EVA, or SGP). One or more of the glass substrates may, or may not, be heat treated (e.g., thermally tempered). The UV reflecting coating 150 is preferably patterned so that it is not provided across the entirety of the IG window unit, and may optionally be provided on surface #1 of the IG window unit so as to be exposed to atmosphere and be at the outermost part of the IG window unit. The "pattern" of the coating 150 on the glass substrate 1 may be in the form of substantially parallel stripes on the glass substrate, or may be any other suitable pattern such as a zig-zag pattern, a pattern of dots, a pattern of squares, a pattern of triangles, or any other suitable pattern.

In certain example embodiments of this invention, the UV reflecting coating 150 (e.g., see FIGS. 4-10) is designed so as to be more visible to birds at high viewing angles (e.g., 30-45 degrees from normal), so that birds approaching the window at such high angles can more easily see the window and avoid hard window collisions. In other words, the UV reflecting coating 150 is designed to have a high contrast ratio (higher visible difference between coated and uncoated areas of the glass) at such high viewing angles. By making the window more visible to birds at such angles, bird collisions and bird deaths can be reduced. Optionally, when lamination is provided via layer 200, provision of the laminated substrates in the IG window can further reduce bird collisions by providing an increased contrast ratio, and improved durability. Improved UV reflective coatings 150 (e.g., see FIGS. 4-10) may be used in any of window structures of FIGS. 1-3 in various example embodiments of this invention. Thus, the improved UV reflective coatings 150 of certain example embodiments of this case may, or may not, be used in conjunction with laminated embodiments herein.

Thus, certain example embodiments make the UV reflective coating 150 more visible to birds. The conventional five layer coatings of U.S. Pat. No. 9,650,290 (e.g., glass/$NbO_x$/$SiO_x$/$NbO_x$/$SiO_x$/$NbO_x$) have poor visibility to birds at angle. UV reflecting coatings are improved herein, so as to have contrast ratio (coated vs uncoated glass) which is higher at angle (e.g., 30-45 degrees from normal) for improved bird visibility (e.g., see FIGS. 4-10), based on bird cone sensitivity values of representative birds. For instance, conventional coatings of U.S. Pat. No. 9,650,290 (e.g., glass/$NbO_x$/$SiO_x$/$NbO_x$/$SiO_x$/$NbO_x$) have a contrast ratio of 1.4 at a 45 degree viewing angle. In certain example embodiments of this case, the UV reflecting coatings according to certain example embodiments of this invention (e.g., see FIGS. 4-10) are designed to have a higher reflective contract ratio (e.g., at least 1.6, more preferably at least 1.7, even more preferably at least 1.8, and most preferably at least 1.9) for birds at a 45 degree viewing angle, and also optionally at low viewing angles such as about 3-8 degrees. This may be achieved, for example, with a new UV reflective coating 150 (e.g., see FIGS. 4-10), which also has low visibility to humans so that it is also aesthetically pleasing to humans. In certain example embodiments, layer thicknesses and/or the number of layers of the UV reflective coating 150 may be adjusted to achieve higher contrast ratios at angle and/or at normal.

By making the window more visible to birds at high viewing angles (e.g., 30-45 degrees from normal), hard bird collisions and bird deaths can be reduced. The particular UV reflecting coating(s) 150 provided herein, and/or the provision of laminated substrates, is/are particularly advantageous for bird collision windows, because each of these increases the contrast ratio of the IG window unit between areas having the UV reflecting coating 150 and areas not having the UV reflecting coating, with the improved coatings having a significant impact at higher viewing angles, thereby making the window more visible to birds and reducing the likelihood of bird collisions.

Referring to FIG. 1 for example, a UV reflective coating 150 (e.g., see FIGS. 4-10) according to example embodiments of this invention may be provided on the exterior surface of glass substrate 1 in a patterned manner. Low-E coating 19 may be provided on the other side of glass substrate 1, with air gap 17 (which may be filled with a gas such as argon) being provided between glass substrates 1 and 30 of the IG window unit.

Figure 2:
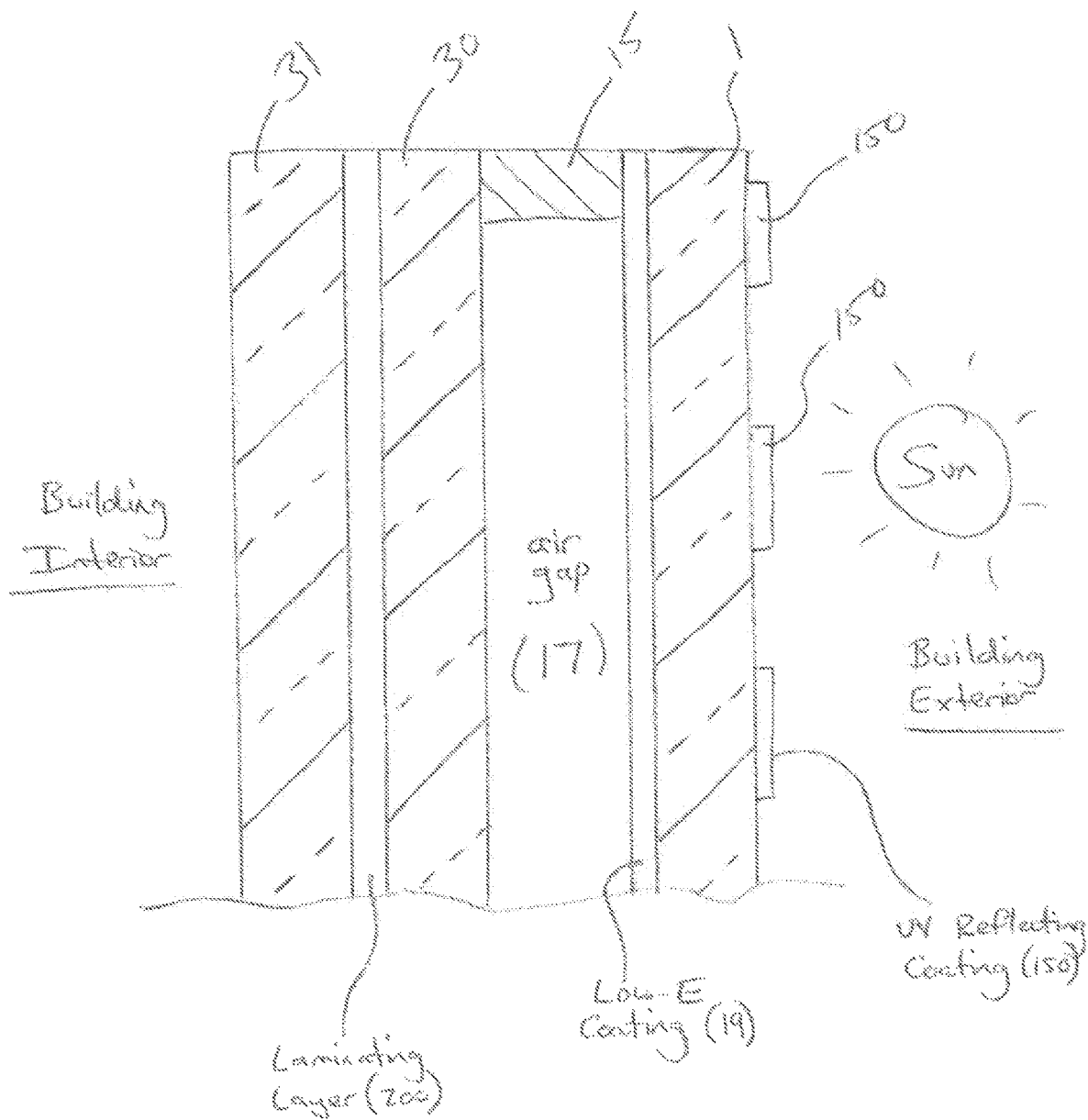
FIG. 2 is a cross sectional view of an IG window unit according to an example embodiment of this invention.
Figure 3:
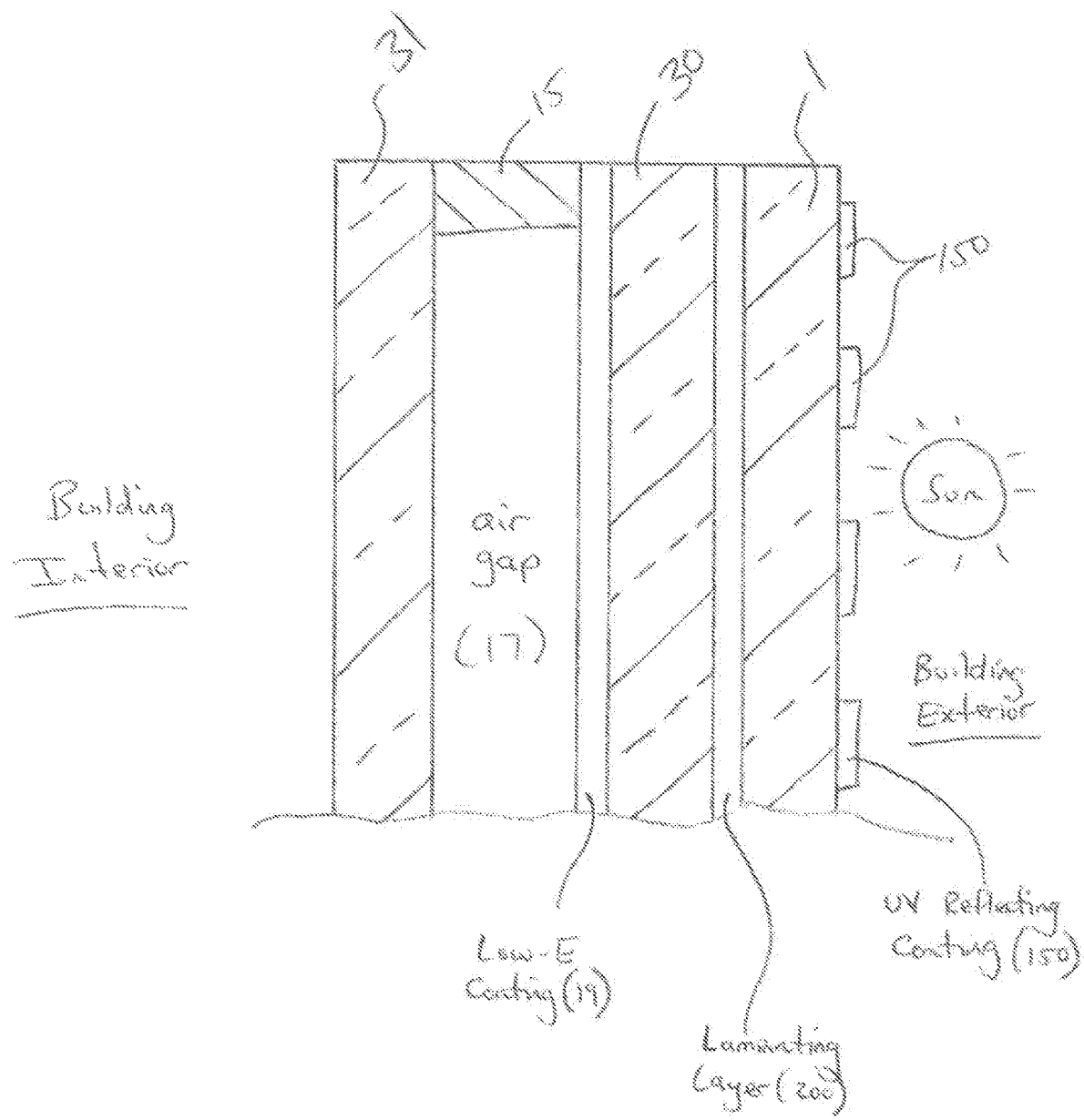
FIG. 3 is a cross sectional view of an IG window unit according to another example embodiment of this invention.

In other example embodiments of this case, referring to FIGS. 2-3 for example which are laminated embodiments, a pair of spaced apart substrates 30, 31 may be separated from one another by at least one seal and/or spacer 15. In certain example embodiments, there is provided a solar management coating (e.g., low-E coating) 19 for blocking at least some infrared (IR) radiation and a UV reflecting blocking coating 150 (e.g., see FIGS. 4-10) for reflecting UV radiation to make the window more visible to birds in order to reduce collisions. In certain example embodiments, the low-E coating 19 may have an emissivity ($E_n$) of no greater than 0.10 and/or a sheet resistance ($R_s$) of no greater than 8 ohms/square. In certain example embodiments, the UV reflecting coating 150 may block at least 38% (more preferably at least 40%, more preferably at least 55%, even more preferably at least 60%, and possibly at least 65%) of UV radiation in at least a substantial part of the range from 350 to 420 nm (or alternatively in at least a substantial part of the range from 330-400 nm). This increases the UV reflection of the window unit intended for commercial or residential applications in order to make such windows more visible to birds thereby preventing or reducing bird collisions. The use of such coatings 150 herein enhances the performance of the glass or window by increasing the UV reflectance beyond the normal limits of raw uncoated plate glass. In certain example embodiments, the UV reflecting/blocking coating 150 is patterned (e.g., in a grid pattern or in a parallel striped pattern) on the window unit, as shown in FIGS. 1-3, which can make it even more visible to birds to reduce bird collisions.

The IG window units of FIGS. 1-3 preferably have a visible transmission of at least about 30%, more preferably at least about 50%, more preferably of at least about 60%, and even more preferably of at least about 65% or at least about 70%. However, patterned coating 150 on glass substrate 1 need not be used in IG window units in all applications, and instead may be used in other applications such as spandrel applications which are substantially opaque, monolithic window units, and laminated window units. For example, UV reflecting coating 150 can be provided on glass substrate 1 in a single or double sided laminated window unit where the UV reflecting coating 150 (patterned, or not patterned) is provided on one or both sides of the laminated window unit (e.g., for zoo application where birds can fly on either side of the window unit, but where humans and lions are on their respective sides). For example, monolithic coated articles having only the coating 150 on a glass substrate 1 may have: (a) a visible transmission of at least about 10%, more preferably of at least about 50%, even more preferably of at least about 80%, and sometimes of at least about 85%, (b) film side UV reflectance of at least 38% (more preferably at least 40%, more preferably at least 55%, even more preferably at least 60%, and possibly at least 65%) in areas where the coating 150 is present, and (c) film side visible reflectance of less than about 25%, more preferably less than about 20%, and most preferably less than about 10%. Thus, the film side UV reflectance may be at least about 4 times higher in the areas where coating 150 is present on the glass 1 compared to areas where coating 150 is not present on the glass 1 (more preferably at least about 5 times higher, even more preferably at least about 8 times higher, and possibly at least 10 times higher).

In FIGS. 2-3, the polymer based laminating film 17 preferably absorbs UV, and may be of or include PVB, EVA, SGP, or the like. Thus, FIGS. 2 and 3 differ from each other mainly in that (i) the laminated structure is provided on the inboard side of the air gap 17 and on the inboard side of the low-E coating 19 in FIG. 2, but is provided on the outboard side of the air gap 17 and low-E coating 19 in FIG. 3, and (ii) FIG. 3 provides for a structure allowing two single-coated-side glass substrates 1 and 30 to be provided which improves production durability and processing so as to reduce likelihood of coating damage during processing, manufacturing, and/or shipping. With respect to point (ii), in FIG. 3 glass substrate 1 is only coated on one side with UV coating 150, and glass substrate 30 is only coated on one side with low-E coating 19, in the manufacturing process (laminating film 200 is an interlayer for laminating/adhering purposes and is not a film that is sputter-deposited or otherwise deposited onto a surface of a substrate). In contrast, the FIG. 2 embodiment requires that both sides of glass substrate 1 be coated, one side with the UV coating 150 and the other side with the low-E coating, which can increase risk of damage during processing, shipping, and/or handling. The IG window units of FIGS. 2-3 may include a solar management coating 19 (e.g., low-E coating) that is supported on an inboard side of glass substrate 1 (FIG. 2) or on an inboard side of glass substrate 30 (FIG. 3). Low-E coating 19 includes one or more layers, although in many embodiments it is a multi-layer coating. Low-E coating 19 includes at least one IR reflecting layer (e.g., based on silver or gold) sandwiched between at least first and second dielectric layers. Since one example function of low-E coating 19 is to block (i.e., reflect and/or absorb) certain amounts of IR radiation and prevent the same from reaching the building interior, the solar management coating 9 includes at least one IR blocking (i.e., IR reflecting and/or absorbing) layer. Example IR blocking layer(s) which may be present in coating 19 are of or include silver (Ag), nickel-chrome (NiCr), gold (Au), and/or any other suitable material that blocks significant amounts of IR radiation. It will be appreciated by those skilled in the art that IR blocking layer(s) of low-E coating 19 need not block all IR radiation, but only need to block significant amounts thereof. In certain embodiments, each IR blocking layer of coating 19 is provided between at least a pair of dielectric layers. Example dielectric layers include silicon nitride, titanium oxide, silicon oxynitride, tin oxide, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example low-E coatings 19 are described in U.S. Pat. Nos. 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. In certain example embodiments, before and/or after optional heat treatment (e.g., thermal tempering and/or heat bending), the low-E coating 19 may have a sheet resistance ($R_s$) of no greater than 8 ohms/square, more preferably no greater than 6 ohms/square, and most preferably no greater than 4 ohms/square. In certain embodiments, the low-E coating 19 may have an emissivity ($E_n$) after heat treatment of no greater than 0.10, more preferably no greater than 0.07, and even more preferably no greater than 0.05 (before and/or after optional heat treatment). Of course, solar management coatings 19 herein are not limited to these particular coatings, and any other suitable solar management coatings capable of blocking amounts of IR radiation may instead be used. Solar management coatings 19 herein may be deposited on substrate(s) 1 and/or 30 in any suitable manner, including but not limited to sputtering, vapor deposition, and/or any other suitable technique.

Referring to FIGS. 1-3, the IG window units include UV reflecting coating 150 for reflecting significant amounts of UV radiation thereby making the window more visible to birds. Coatings 150 may be sputter-deposited in example embodiments of this invention. UV reflecting coating 150 may be, for purposes of example and without limitation, any of the UV reflecting coatings illustrated in FIGS. 4-6. This increases the UV reflection of the window unit in order to make such windows more visible to birds thereby preventing or reducing bird collisions. The use of such coatings 150 herein enhances the performance of the glass or window by increasing the UV reflectance beyond the normal limits of raw uncoated plate glass. In certain example embodiments, the UV reflecting coating 150 is in direct contact with the glass substrate 1 on the exterior surface thereof, and is not part of a low-E coating 19. In particular, there are no IR reflecting layers (e.g., silver based, gold based, NiCr, or IR reflecting TCO-based layers) in coating 150, and there are no IR reflecting layers on the side of the substrate 1 on which the coating 150 is provided. Instead, any low-E coatings (e.g., see low-E coating 19) may be provided on the other side of substrate 1 from coating 150 or alternatively on substrate 30. In certain example embodiments, the UV reflecting coating 150 may block (e.g., absorbs and/or reflects) at least 38% (more preferably at least 40%, more preferably at least 50% or 55%, even more preferably at least 60%, and possibly at least 65%) of UV radiation in at least a substantial part of the range from 350 to 420 nm (or alternatively in at least a substantial part of the range from 330-400 nm, or alternatively in at least a substantial part of the range from 330-380 nm).

The UV reflecting coating 150 may be patterned (e.g., in the shape of a grid or in substantially parallel or non-parallel stripes, crossing stripes, or other shapes/forms) on the surface of substrate 1 as shown in FIGS. 1-3, or alternatively may be provided continuously across substantially the entire surface of substrate 1 in other embodiments. The patterned shape of coating 150 may be formed as follows, for purposes of example. A pattern (not shown) is provided on the surface of substrate 1 prior to the coating 150 being formed, with the pattern being located in areas which are ultimately to be free of coating 150. After the pattern is formed, a coating 150 is continuously formed across the entire or substantially the entire surface of substrate 1 over the pattern. The pattern can then be removed (along with the portions of coating 150 located directly over it) in order to create a patterned coating 150, so that the coating 150 remains on only the portions of the substrate where the original pattern was not deposited. Thus, a patterned coating 150 can be formed in such a manner in example embodiments of this invention. The remaining patterned coating 150 is substantially invisible to human eyes, but is visible to bird eyes as explained above.

FIGS. 7-10 illustrate film side reflection from certain example embodiments of this invention across a range of wavelengths, including UV wavelengths. The high UV reflection at different viewing angles at the left sides of FIGS. 7-10, for the coated articles of various examples of this invention, demonstrates that a high reflective contrast ratio CR(RF) will be realized for UV and possibly certain blue wavelengths, thereby rendering the windows more easily to be seen by bird at various viewing angles, where RF is calculated from a bird's perspective.

$$CR(RF) = \frac{RF_{w\_UV}}{RF_{wo\_UV}}$$

Thus, the contrast ratio of the IG unit has surprisingly been found to be significantly higher at the combination of low and high viewing angles, compared to conventional coatings, and will thus be more visible to birds at high viewing/approach angles and thus realize less bird collisions.

Figure 4:
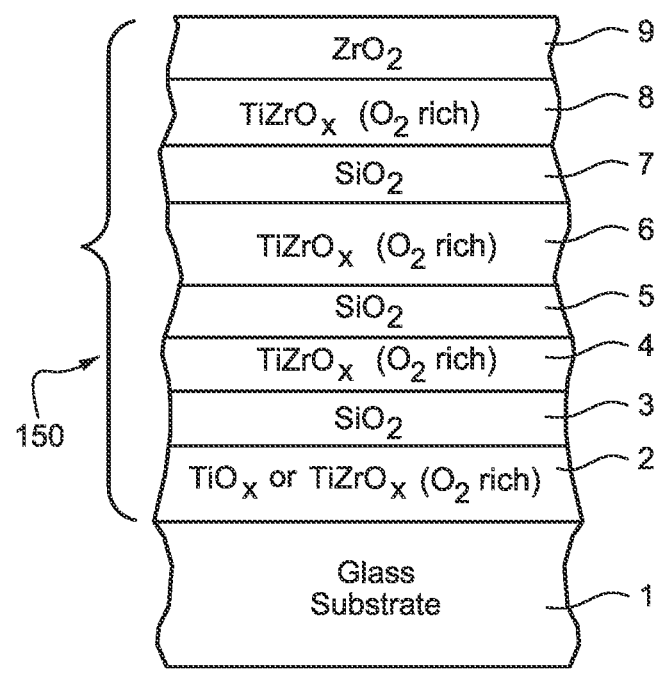
FIG. 4 is a cross sectional view of a coated article, including a UV reflective coating, which may be used in conjunction with the structures of any of FIGS. 1-3 according to certain example embodiments of this invention.
Figure 5:
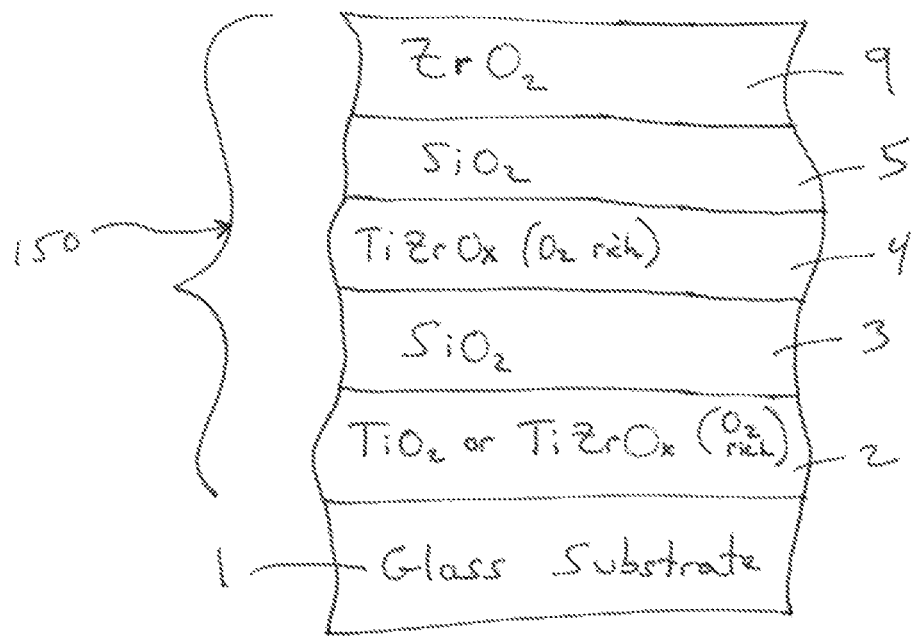
FIG. 5 is a cross sectional view of another coated article, including a UV reflective coating, which may be used in conjunction with the structures of any of FIGS. 1-3 according to certain example embodiments of this invention.
Figure 6:
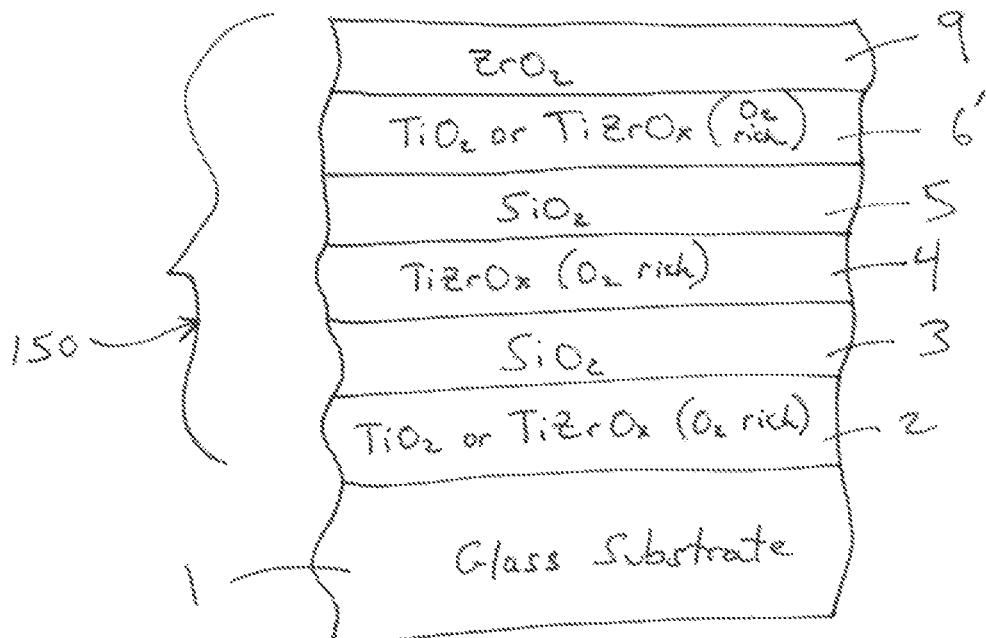
FIG. 6 is a cross sectional view of another coated article, including a UV reflective coating, which may be used in conjunction with the structures of any of FIGS. 1-3 according to certain example embodiments of this invention.

FIGS. 4-6 are cross sectional views of various UV reflecting coatings 150 that may be used on substrate 1 in the IG window unit of any of FIGS. 1-3 in example embodiments of this invention. Glass substrate 1 may be soda-lime-silica based glass or any other suitable type of glass, and may be from about 1-10 mm thick, more preferably from about 2-6 mm thick, in example embodiments of this invention.

In the FIG. 4 embodiment, UV reflecting coating 150 includes high index transparent dielectric layers 2, 4, 6 and 8. High index transparent dielectric layers 2, 4, 6 and 8 may be of or include an oxide of Ti (e.g., $TiO_x$). One, two, three, or all four of high index transparent dielectric layers 2, 4, 6 and 8 may be oxygen-rich, so that for example the oxide of Ti may be represented by $TiO_x$ where x is at least 2.01, more preferably from 2.01-2.25, even more preferably from 2.02 to 2.20, and still more preferably from 2.03 to 2.20. It is also possible that the oxide of Ti may be $TiO_2$ in one or more of layers 2, 4, 6 and/or 8.

In certain example embodiments, one, two, three, or all four of high index transparent dielectric layers 2, 4, 6 and 8 may have, at a wavelength of 360 nm, a "k" value of less than 0.025, more preferably less than 0.024, and most preferably less than 0.023, and an "n" value of at least 2.90, more preferably at least 2.91, and most preferably at least 2.95. In certain example embodiments, one, two, three, or all four of high index transparent dielectric layers 2, 4, 6 and 8 may have, at a wavelength of 380 nm, a "k" value of less than 0.0001, and an "n" value of at least 2.75. It has been surprisingly and unexpectedly found that designing one or more of the high index layers to have such n and k values, such as via the oxygen-rich technique described above, cuts down on UV absorption and thus allows UV reflection to be increased including at high viewing angles, so as to render windows more visible to birds at high viewing angles such as 45 degrees.

In certain example embodiments, one, two, three, or all four of high index transparent dielectric layers 2, 4, 6 and 8 may be of or include an oxide of Ti that is doped with at least one other element such as Zr, Ce, Nb, or the like. For example, one, two, three, or all four of high index transparent dielectric layers 2, 4, 6 and 8 may be of or include an oxide of Ti that is doped so that a meal content of the layer(s) is from about 1-25% Zr and/or Ce, more preferably from about 2-20% Zr and/or Ce, even more preferably from 5-15% Zr and/or Ce, with an example being a metal content of the layer being about 10% Zr and/or Ce (atomic %). For example, one, two, three, or all four of high index transparent dielectric layers 2, 4, 6 and 8 may be of or include an oxide of Ti doped with Zr (e.g., $TiZrO_x$), which may be oxygen rich as described above. For example, it has been surprisingly found that in this particular coating the addition of the Zr (and/or oxide thereof) to the $TiO_x$ helps reduce haze and delamination, and also with manufacturing costs. For example and without limitation, any or all of layers 2, 4, 6 and/or 8 may be sputter-deposited using $TiZrO_x$ targets made of $TiO_x$ (where x may be from 1.5 to 2.0 for example) and $ZrO_2$, where the sputtering may be performed in an atmosphere including at least oxygen gas sufficient for the oxygen-rich feature if desired.

Alternatively, high index transparent dielectric layer 2 for example may be of or including an oxide of Ti (e.g., $TiO_2$), an oxide of Nb, or an oxide of Ti and Zr (e.g., $TiZrO_x$) which may be oxygen rich, for example.

Low index transparent dielectric layers 3, 5, and 7 may be of or include silicon oxide (e.g., $SiO_2$) which may or may not be doped with other element(s) such as aluminum and/or nitrogen. In certain example embodiments, any of the silicon oxide layers 3, 5 and/or 7 may be doped with other material such as from about 1-8% aluminum and/or from about 1-10% nitrogen. One or more of layers 2, 4, 6 and/or 8 may also be doped with other material in certain example instances. Optional overcoat 9, of or including a material such as an oxide of zirconium (e.g., $ZrO_2$), may also be provided. Other layer(s) may be added to the FIG. 4 embodiment, and it is also possible for one or more layers to be removed from the FIG. 4 embodiment. Each of layers 2-9 is considered "transparent" to visible light because each of these layers, standing alone, is substantially transparent to visible light (e.g., at least about 50% transparent, more preferably at least about 60% or 70% transparent to visible light).

The "oxygen rich" feature of one, two, three, or all four of high index layers 2, 4, 6 and/or 8 relates to an oxygen-rich stoichiometry of the final layer. This is done in order to lower absorption, and increase reflection, in the UV (ultraviolet). For instance, stoichiometric $TiO_2$ is prone to having high absorption in the UV, and this high absorption decreases reflection. Thus, in order to provide high UV reflection at both normal and across a wide range of viewing angles, in certain example embodiments, of this invention, one, two, three, or all four of high index layers 2, 4, 6 and/or 8 are provided with an oxygen-rich stoichiometry. The desirable results of this can be seen in the UV reflectance graphs, depicted in FIGS. 7-10.

The FIG. 5 embodiment is the same as the FIG. 4 embodiment described herein, except that layers 6-8 have been removed from the FIG. 4 embodiment. See the description above of the layers 2-5 and 9 of the FIG. 5 embodiment.

The FIG. 6 embodiment is the same as the FIG. 4 embodiment described herein, except that layers 7-8 have been removed from the FIG. 4 embodiment. See the description above of the layers 2-6 and 9 of the FIG. 5 embodiment. It is also noted that in the FIG. 6 embodiment layer 6' may be omitted, or layer 6' may be an oxide of Ti and Zr (e.g., $TiZrO_x$), which may be oxygen rich, or alternatively may be of or include a different material such as an oxide of Ti (e.g., $TiO_2$).

High index transparent dielectric layers 2, 4, 6 (or 6') and 8 may have a refractive index (n) of from about 2.15 to 2.7, more preferably from about 2.3 to 2.6 (at 550 nm). Low index transparent dielectric layers 3, 5 and 7 of or including silicon oxide may have a refractive index (n) of from about 1.4 to 1.7, more preferably from about 1.4 to 1.6, and most preferably from about 1.45 to 1.55 (all refractive index n values herein are measured at 550 nm). Transparent dielectric layers 2-9 are preferably deposited by sputtering in example embodiments of this invention.

In certain example embodiments of the FIG. 4-6 embodiments of this invention: transparent dielectric layer 2 may be from about 4-25 nm thick, more preferably from about 8-17 nm thick, and most preferably from about 10-15 nm thick; transparent dielectric layer 3 of or including silicon oxide may be from about 30-100 nm thick, more preferably from about 50-70 nm thick, even more preferably from about 55-63 nm thick; transparent dielectric layer 4 may be from about 20-60 nm thick, more preferably from about 30-40 nm thick, even more preferably from about 32-36 nm thick; transparent dielectric layer 5 of or including silicon oxide may be from about 20-130 nm thick, more preferably from about 25-100 nm thick, even more preferably from about 30-60 nm thick; transparent dielectric layer 6 (or 6') may be from about 20-60 nm thick, more preferably from about 25-45 nm thick, even more preferably from about 30-40 nm thick; transparent dielectric layer 7 of or including silicon oxide may be from about 30-100 nm thick, more preferably from about 50-80 nm thick, even more preferably from about 60-70 nm thick; transparent dielectric layer 8 may be from about 4-60 nm thick, more preferably from about 5-30 nm thick, even more preferably from about 10-15 nm thick; and optional transparent overcoat protective dielectric layer 9 of or including zirconium oxide may be from about 5-60 nm thick, more preferably from about 5-30 nm thick, even more preferably from about 5-20 nm thick, with an example thickness being about 10-11 nm. To realize the desired UV reflectance and visible transmission values herein, layer 4 is preferably substantially thicker than layer 2. For example, in certain example embodiments, layer 4 is at least about 10 nm thicker (more preferably at least about 15 nm thicker) than layer 2. Moreover, to realize the desired UV reflectance and visible transmission values herein, layer 6 is preferably substantially thicker than layer 8. For example, in certain example embodiments, layer 6 is at least about 10 nm thicker (more preferably at least about 15 nm thicker) than layer 8.

Examples

The following examples are provided for purposes of example, with respect to implementing certain example non-limiting embodiments of this invention.

Example 1 is based on the coating 150 of FIG. 4. See FIGS. 4 and 7. For bird deterrence, it is desirable for UV reflective coating 150 to be visible to birds during flight. Coating 150 is designed to maintain good deterrence at least up to a 45-degree angle from normal incidence as birds fly in all directions. For angles greater than 45 degrees, one tip of the wing(s) may contact the glass on approach which can alert the bird of its presence before a hard collision occurs. With that in mind, all designs and measurements herein check the spectral response at two angles: at a typical 8-degree viewing angle and also at a viewing angle of 45 degrees. The coating of Example 1 is set forth in the table below.

| Coating 150 of Example 1 | |
|---|---|
| Material | Layer thickness (nm) |
| Glass | |
| TiO2 or TiZrOx O2 rich | 14.0 |
| SiO2 | 55.6 |
| TiZrOx O2 rich | 34.9 |
| SiO2 | 43.1 |
| TiZrOx O2 rich | 31.6 |
| SiO2 | 66.9 |
| TiZrOx O2 rich | 10.1 |
| ZrO2 | 10.0 |

The following optical results were obtained from the coating of Example 1, where Rf refers to film side visible reflectance, T refers to visible transmission, and Rg refers to glass side visible reflectance.

| | Y | a* | b* |
|---|---|---|---|
| Rf 8 degree | 9.1 | −1.5 | 2.0 |
| Rf 45 degree | 10.8 | −0.3 | 1.9 |
| T 2 degree | 88.1 | −1.9 | −0.1 |
| Rg 8 degree | 9.1 | −1.5 | 1.9 |

This design has a slightly higher reflection in the visible than naked glass (9.1% vs. 8.3%), but the color remains fairly neutral and the coating nearly invisible to the human eye.

Figure 7:
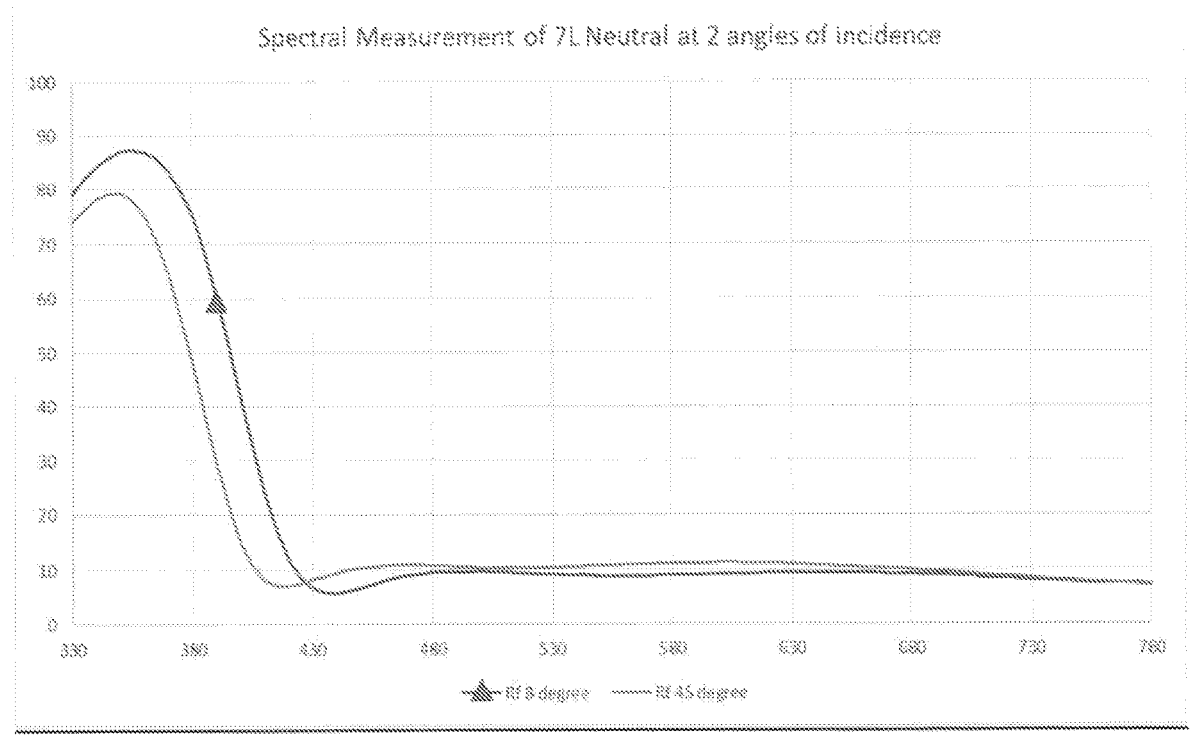
FIG. 7 is a graph plotting UV reflectance (vertical axis, UV reflectance %) of the coated article of Example 1 across a wide range of wavelengths (330-780 nm, horizontal axis), demonstrating that the coated article of this example has a high UV reflectance at both an 8 degree viewing angle (Δ plot) and a 45 viewing angle, from the normal viewing angle.

With respect to UV wavelengths visible to birds, FIG. 7 is a graph plotting film side UV reflectance (vertical axis, UV reflectance %) of the coated article of Example 1 across a wide range of wavelengths (330-780 nm, horizontal axis). As shown in FIG. 7, it has surprisingly and unexpectedly been found that the layer stack of Example 1 provides for a coated article having a high film side UV reflectance at both an 8 degree viewing angle (Δ plot) and a 45 viewing angle. Not only is the UV reflection high at substantially normal incidence (8 degrees), it remains significant at 45 degrees. This makes the coating highly visible to birds across a wide range of viewing angles.

Example 2 is also based on the coating 150 of FIG. 4. See FIGS. 4 and 8. The coating of Example 2 is set forth in the table below.

| Coating 150 of Example 2: Neutral Light Blue | |
|---|---|
| Material | Layer thickness (nm) |
| Glass | n/a |
| TiO2 or TiZrOx O2 rich | 13.5 |
| SiO2 | 58.0 |
| TiZrOx O2 rich | 35.1 |
| SiO2 | 39.4 |
| TiZrOx O2 rich | 35.6 |
| SiO2 | 60.2 |
| TiZrOx O2 rich | 12.0 |
| ZrO2 | 11.0 |

Example 2 has been found to have higher UV reflection than Example 1. The color along with greater UV reflection of Example 2 makes it more visible to birds, while the soft blue (note the b* below) adds a cosmetic value for human customers who want to show the coating for human aesthetic purposes. The coating 150 of Example remains substantially invisible to humans, based on the optical data for Example 2 below.

|  | Y | a* | b* |
| --- | --- | --- | --- |
| Rf 8 degree | 11.7 | 2.6 | −9.1 |
| Rf 45 degree | 12.6 | −1.3 | −0.7 |
| T 2 degree | 87.3 | −1.64 | 2.91 |
| Rg 8 degree | 11.2 | 2.5 | −9.0 |

Figure 8:
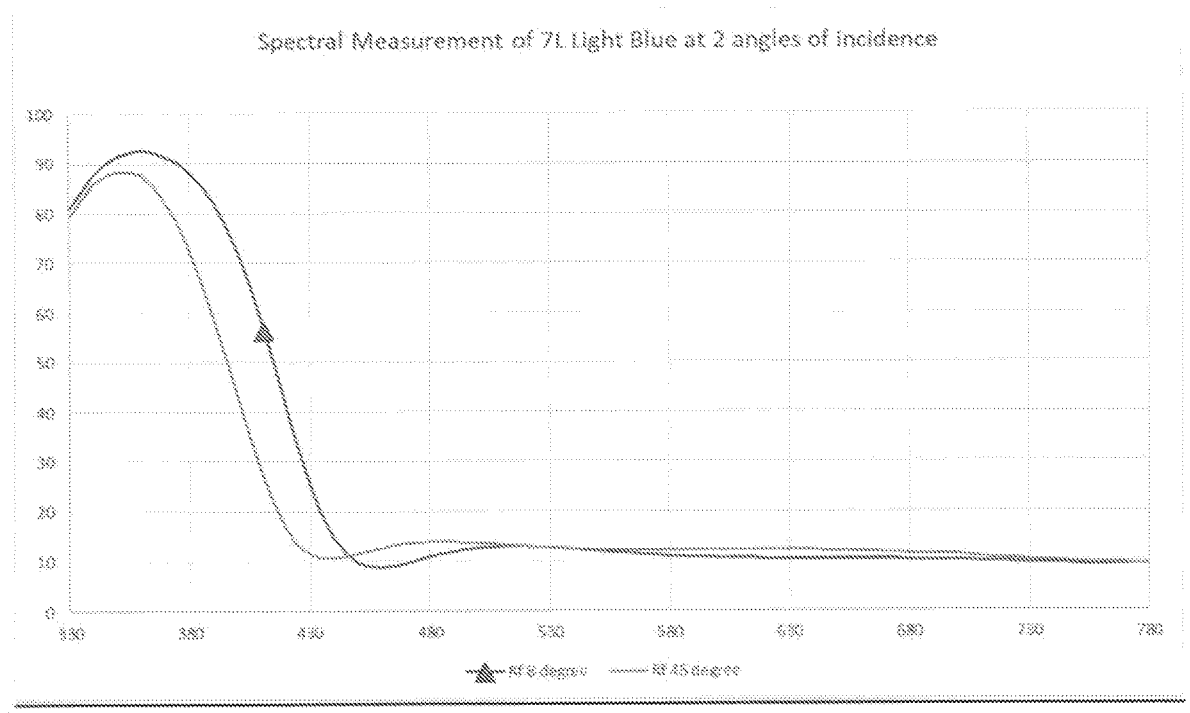
FIG. 8 is a graph plotting UV reflectance (vertical axis, UV reflectance %) of the coated article of Example 2 across a wide range of wavelengths (330-780 nm, horizontal axis), demonstrating that the coated article of this example has a high UV reflectance at both an 8 degree viewing angle (Δ plot) and a 45 viewing angle, from the normal viewing angle.

With respect to UV wavelengths visible to birds, FIG. 8 is a graph plotting film side UV reflectance (vertical axis, UV reflectance %) of the coated article of Example 2 across a wide range of wavelengths (330-780 nm, horizontal axis). As shown in FIG. 8, it has surprisingly and unexpectedly been found that the layer stack of Example 2 provides for a coated article having a high film side UV reflectance at both an 8 degree viewing angle (Δ plot) and a 45 viewing angle. Not only is the UV reflection high at substantially normal incidence (8 degrees), it remains significant at 45 degrees. This makes the coating highly visible to birds across a wide range of viewing angles.

In certain example embodiments, the coating 150 is designed so that the window when viewed form the film side thereof has a film side reflective b* color value of from −7 to −30 (more preferably from −10 to −30) in order to provide blue color visible to birds (Ill. C, 2 Obs., or Rf at the 8 degree viewing angle), to still further reduce bird collisions.

Example 3 is also based on the coating 150 of FIG. 4. See FIGS. 4 and 9. The coating of Example 3 is set forth in the table below.

| Coating 150 of Example 3: Blue XT | |
| --- | --- |
| Material | Layer thickness (nm) |
| Glass | n/a |
| TiO2 or TiZrOx O2 rich | 10.8 |
| SiO2 | 62.5 |
| TiZrOx O2 rich | 32.2 |
| SiO2 | 34.5 |
| TiZrOx O2 rich | 39.6 |
| SiO2 | 61.7 |
| TiZrOx O2 rich | 14.7 |
| ZrO2 | 11.0 |

Example 3 is excellent for bird deterrence of all UV designs, and it remains practically invisible in transmission to the naked eye of humans in normal viewing conditions. The blue color of Example 3 is more intense than Example 2 (see b* values), but the visible reflection for humans is still fairly low at 11.6% (glass is 8.3%), as shown by the optical data for Example 3 as follows.

|  | Y | a* | b* |
| --- | --- | --- | --- |
| Rf 8 degree | 11.6 | −0.8 | −16.3 |
| Rf 45 degree | 12.6 | −2.1 | −11.6 |
| T 2 degree | 87.0 | −0.6 | 5.0 |
| Rg 8 degree | 11.5 | −1.0 | −15.8 |

Figure 9:
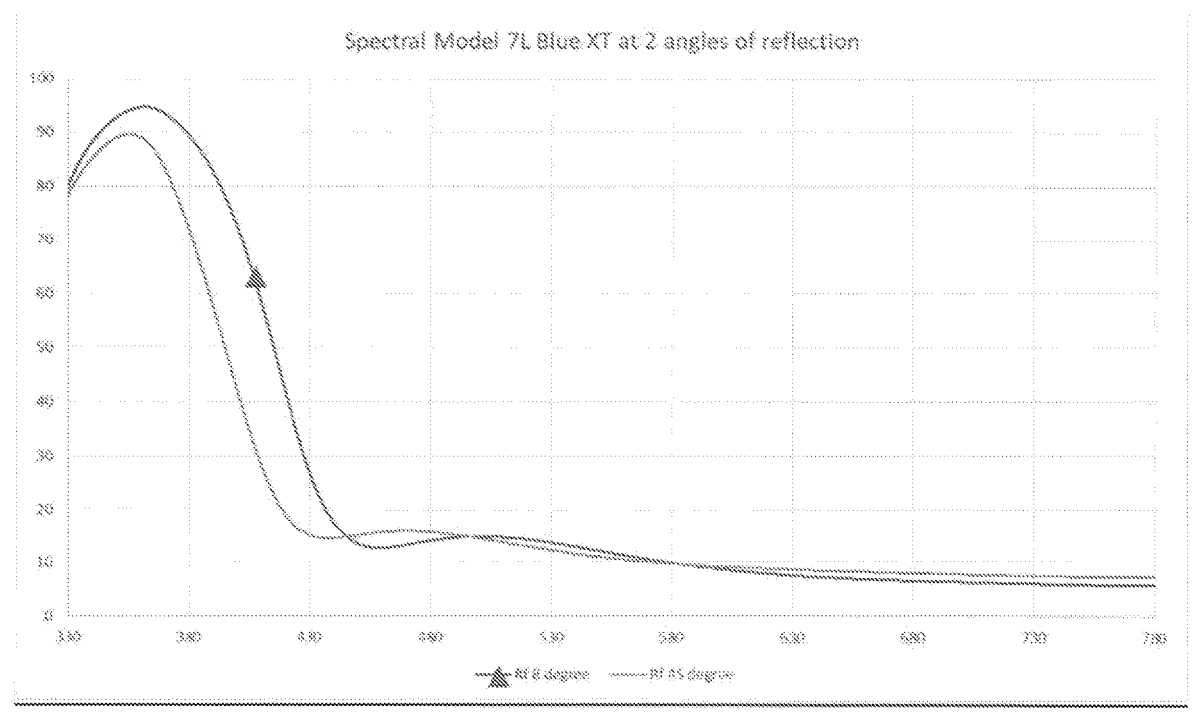
FIG. 9 is a graph plotting UV reflectance (vertical axis, UV reflectance %) of the coated article of Example 3 across a wide range of wavelengths (330-780 nm, horizontal axis), demonstrating that the coated article of this example has a high UV reflectance at both an 8 degree viewing angle (Δ plot) and a 45 viewing angle, from the normal viewing angle.

With respect to UV wavelengths visible to birds, FIG. 9 is a graph plotting film side UV reflectance (vertical axis, UV reflectance %) of the coated article of Example 3 across a wide range of wavelengths (330-780 nm, horizontal axis). As shown in FIG. 9, it has surprisingly and unexpectedly been found that the layer stack of Example 3 provides for a coated article having a high film side UV reflectance at both an 8 degree viewing angle (Δ plot) and a 45 viewing angle. Not only is the UV reflection high at substantially normal incidence (8 degrees), it remains significant at 45 degrees. This makes the coating highly visible to birds across a wide range of viewing angles. The UV reflection is the greatest with a blue color that remains at angle (e.g., 45 degrees) due to the advantageous design which allows a bump in the 430-500 nm visible range while maintaining a low reflection in the higher visible wavelengths. Moreover, the continuously decreasing slope towards the near IR prevents/reduces the coating from turning red at any reasonable angle of viewing.

Example 4 is based on the coating 150 of FIG. 5. See FIGS. 5 and 10. The coating of Example 4 is set forth in the table below.

| Coating 150 of Example 4: 5L Blue Ultra | |
| --- | --- |
| Material | Layer thickness (nm) |
| Glass | n/a |
| TiO2 or TiZrOx O2 rich | 23.5 |
| SiO2 | 60.9 |
| TiZrOx O2 rich | 33.6 |
| SiO2 | 59.0 |
| ZrO2 | 11.3 |

Example 4 is excellent for bird deterrence, and needs only five layers. The coating remains practically invisible to the naked eye of humans in transmission in normal viewing conditions, the blue color is intense, but the reflection is still fairly low at 10.6% (glass is 8.3%), as shown in the optical data for Example 4 below.

|  | Y | a* | b* |
| --- | --- | --- | --- |
| Rf 8 degree | 10.6 | 0.1 | −14.1 |
| Rf 45 degree | 11.7 | −3.3 | −10.2 |
| T 2 degree | 88.6 | −1.4 | 3.7 |
| Rg 8 degree | 9.8 | 0.0 | −13.4 |

Figure 10:
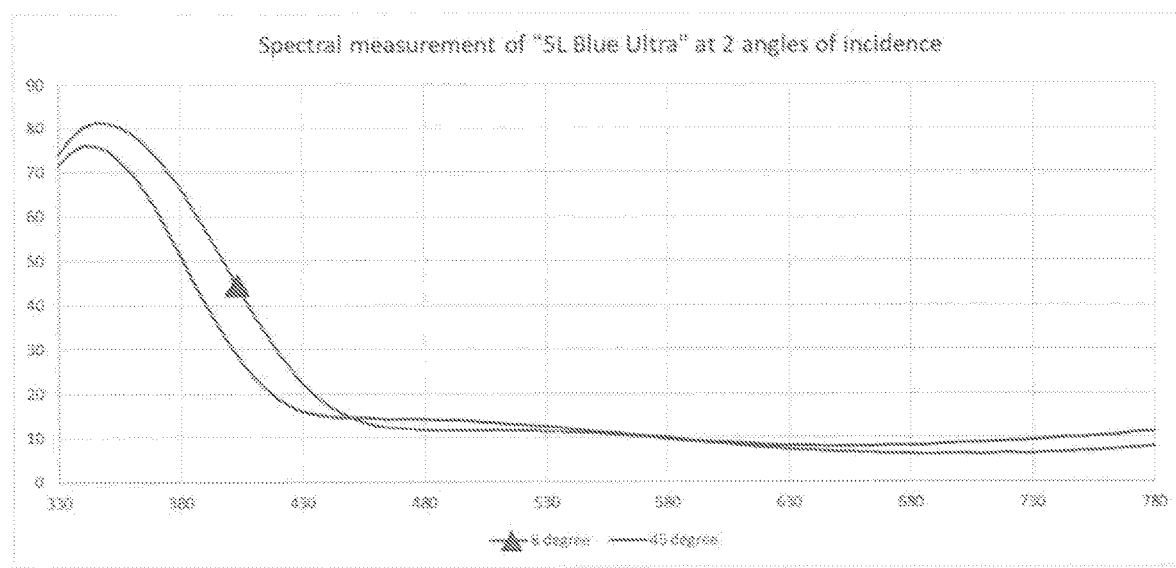
FIG. 10 is a graph plotting UV reflectance (vertical axis, UV reflectance %) of the coated article of Example 4 across a wide range of wavelengths (330-780 nm, horizontal axis), demonstrating that the coated article of this example has a high UV reflectance at both an 8 degree viewing angle (Δ plot) and a 45 viewing angle, from the normal viewing angle.

With respect to UV wavelengths visible to birds, FIG. 10 is a graph plotting film side UV reflectance (vertical axis, UV reflectance %) of the coated article of Example 4 across a wide range of wavelengths (330-780 nm, horizontal axis). As shown in FIG. 10, it has surprisingly and unexpectedly been found that the layer stack of Example 4 provides for a coated article having a high film side UV reflectance at both an 8 degree viewing angle (Δ plot) and a 45 viewing angle. Not only is the UV reflection high at substantially normal incidence (8 degrees), it remains significant at 45 degrees. This makes the coating highly visible to birds across a wide range of viewing angles. The UV reflection is excellent, and the coating increases its reflection in the 430-500 nm range at angle while maintaining a low reflection in higher visible wavelengths.

Example 5 is based on the coating 150 of FIG. 5. See FIG. 5. The coating of Example 5 is set forth in the table below.

Coating 150 of Example 5:
5L Blue Baseline Alternate

| Material | Layer thickness (nm) |
|---|---|
| Glass | n/a |
| TiO2 or TiZrOx O2 rich | 22.6 |
| SiO2 | 52 |
| TiZrOx O2 rich | 36 |
| SiO2 | 57 |
| TiO2 or TiZrOx O2 rich | 4 |
| ZrO2 | 7 |

Advantageously, the color shift at angle is nearly non-existent (note below the similar a* and b* film side reflective values between the 8 and 45 degree viewing angles), so as to be aesthetically pleasing for humans. The UV reflection across the range of viewing angles is good as well.

| | RY | a* | b* |
|---|---|---|---|
| Rf 8 degree | 11.0 | −3.0 | −8.8 |
| Rf 45 degree | 12.2 | −3.3 | −9.2 |
| T 2 degree | 87.5 | −0.8 | 2.3 |
| Rg 8 degree | 10.9 | −2.9 | −8.4 |

It can be seen in FIGS. 7-10 that in certain example preferred embodiments of this invention the IG window unit, as viewed from the exterior thereof, has a UV reflectance of at least 30% (more preferably at least 40%, and most preferably of at least 50%, and sometime at least 60%) at a wavelength of 380 nm for both a viewing angle of 8 degrees and a viewing angle of 45 degrees from normal. It can also be seen that the IG window unit, as viewed from the exterior thereof, has a UV reflectance at a wavelength of 380 nm that does not vary by more than 30% (more preferably by not more than 20%) between the viewing angle of 8 degrees and the viewing angle of 45 degrees.

In an example embodiment of this invention, there is provided an IG window unit for reducing bird collisions, comprising: a first glass substrate; a second glass substrate; wherein the first glass substrate is provided at an exterior side of the IG window unit so as to face an exterior of a building in which the IG window unit is to be mounted; a patterned UV reflecting coating provided on the first glass substrate and on an exterior surface of the IG window unit so as to face an exterior of a building in which the IG window unit is to be mounted; wherein the UV reflecting coating blocks at least 38% of UV radiation in at least a substantial part of a wavelength range from 330-380 nm; wherein the UV reflecting coating comprises, moving away from the first glass substrate: a first high index transparent dielectric layer; a first low index transparent dielectric layer; a second high index transparent dielectric layer; a second low index transparent dielectric layer; and wherein the IG window unit, as viewed from the exterior thereof, has a UV reflectance of at least 30% at a wavelength of 380 nm for both a viewing angle of 8 degrees and a viewing angle of 45 degrees from normal.

The IG window unit of the immediately preceding paragraph, as viewed from the exterior thereof, may have a UV reflectance of at least 40% at a wavelength of 380 nm for both a viewing angle of 8 degrees and a viewing angle of 45 degrees from normal, more preferably a UV reflectance of at least 50% at a wavelength of 380 nm for both a viewing angle of 8 degrees and a viewing angle of 45 degrees from normal, and possibly a UV reflectance of at least 60% at a wavelength of 380 nm for both a viewing angle of 8 degrees and a viewing angle of 45 degrees from normal.

The IG window unit of any of the preceding two paragraphs, as viewed from the exterior thereof, may have a UV reflectance at a wavelength of 380 nm that does not vary by more than 30% between the viewing angle of 8 degrees and the viewing angle of 45 degrees, more preferably a UV reflectance at a wavelength of 380 nm that does not vary by more than 20% between the viewing angle of 8 degrees and the viewing angle of 45 degrees.

In the IG window unit of any of the preceding three paragraphs, the UV reflecting coating may block (absorb and/or reflect) at least 50% of UV radiation in at least a substantial part of a wavelength range from 330-380 nm.

In the IG window unit of any of the preceding four paragraphs, the first and second high index layers may have a refractive index of from 2.15 to 2.7 (at 550 nm), more preferably a refractive index of from 2.3 to 2.6 (at 550 nm).

In the IG window unit of any of the preceding five paragraphs, the first and second low index layers may have a refractive index (n) of from 1.4 to 1.7 (at 550 nm).

In the IG window unit of any of the preceding six paragraphs, the first and second low index layers may comprise an oxide of silicon, and may optionally further comprise nitrogen such that the first and second low index layers may each comprise $SiO_2$, silicon oxynitride, and may be doped with Al or the like.

In the IG window unit of any of the preceding seven paragraphs, the first and/or second high index layers may comprise an oxide of Ti and Zr, which may be oxygen rich, and/or may comprise $TiO_x$ where x is at least 2.01, more preferably from 2.02-2.20.

In the IG window unit of any of the preceding eight paragraphs, a low-E coating may be provided on a side of the first substrate opposite the side at which the UV reflecting coating is provided.

In the IG window unit of any of the preceding nine paragraphs, the UV reflecting coating does not contain any IR reflecting layer based on Ag or Au in certain example embodiments.

The IG window unit of any of the preceding ten paragraphs may further comprise a third glass substrate, wherein the second glass substrate may be provided between at least the first and third glass substrates; wherein the third glass substrate may be provided at an interior side of the IG window unit so as to face an interior of a building in which the IG window unit is to be mounted; wherein the second glass substrate may be laminated via a polymer inclusive laminating film to either the first glass substrate or the third glass substrate; wherein the first glass substrate may be located between the patterned UV reflecting coating and the polymer inclusive laminating film.

The IG window unit of any of the preceding eleven paragraphs may have a visible transmission of at least about 30%.

In the IG window unit of any of the preceding twelve paragraphs, the UV reflecting coating may directly contact the first glass substrate.

In the IG window unit of any of the preceding thirteen paragraphs, the patterned UV reflecting coating may causes the IG window unit to have a contrast ratio of at least 1.6 (more preferably at least 1.7, and even more preferably at least 1.8 or 1.9) at the 45 degree viewing angle, at the wavelength of 380 nm.

The IG window unit of any of the preceding fourteen paragraphs may further include a third high index transparent dielectric layer provided on the first glass substrate over at least the second low index layer, and a third low index transparent dielectric layer provided on the first glass substrate over at least the third high index layer. A fourth high index transparent dielectric layer may also be provided over the third low index layer. At least two of the first, second, and third high index layers may comprise an oxide of Ti and Zr.

In the IG window unit of any of the preceding fifteen paragraphs, one, two, three, or four of the high index layers may have an oxygen-rich stoichiometry.

The IG window unit of any of the preceding sixteen paragraphs may further include an overcoat comprising an oxide of zirconium.

The IG window unit of any of the preceding sixteen paragraphs, as viewed from the exterior, may have a film side reflective b* color value of from −7 to −30 (Ill. C, 2), more preferably from −10 to −30, in order to provide blue color visible to birds for reducing bird collisions.

In the IG window unit of any of the preceding seventeen paragraphs, one, two, three, or more of the high index layers may have an oxygen-rich stoichiometry.

In the IG window unit of any of the preceding eighteen paragraphs, at least one of the high index layers may comprises an oxide of Ti, that is doped with from about 1-20% (atomic %) Zr, Ce, and/or Nb with respect to metal content of the layer.

In the IG window unit of any of the preceding nineteen paragraphs, at least one of the high index layers may have an oxygen rich stoichiometry and comprise an oxide of Ti, that is doped with from about 1-20% (atomic %) Zr with respect to metal content of the layer.

In an example embodiment, there is provided a coated article (e.g., for use in a window unit or spandrel) for reducing bird collisions, comprising: a first glass substrate; a patterned UV reflecting coating provided on the first glass substrate; wherein the UV reflecting coating blocks at least 38% of UV radiation in at least a substantial part of a wavelength range from 330-380 nm; wherein the UV reflecting coating comprises, moving away from the first glass substrate: a first high index transparent dielectric layer; a first low index transparent dielectric layer; a second high index transparent dielectric layer; a second low index transparent dielectric layer; and wherein the coated article, as viewed from an exterior thereof, has a UV reflectance of at least 30% at a wavelength of 380 nm for both a viewing angle of 8 degrees and a viewing angle of 45 degrees from normal.

The coated article of the immediately preceding paragraph may have, as viewed from the exterior thereof, a UV reflectance of at least 40% (more preferably of at least 50% or at least 60%) at a wavelength of 380 nm for both a viewing angle of 8 degrees and a viewing angle of 45 degrees from normal.

The coated article of any of the preceding two paragraphs may have, as viewed from the exterior thereof, a UV reflectance at a wavelength of 380 nm that does not vary by more than 30% between the viewing angle of 8 degrees and the viewing angle of 45 degrees.

In the coated article of any of the preceding three paragraphs, the first and/or second high index layers may have a refractive index of from 2.15 to 2.7, more preferably from 2.3-2.6 (at 550 nm), and/or the first and second low index layers may have a refractive index (n) of from 1.4 to 1.7 (at 550 nm).

In the coated article of any of the preceding four paragraphs, at least one of the first and second high index layers may comprise an oxide of $TiO_x$ where x is at least 2.01 (so as to be oxygen rich).

The coated article of any of the preceding five paragraphs may, as viewed from the exterior, have a film side reflective b* color value of from −7 to −30 (more preferably −10 to −30)(Ill. C, 2) in order to provide blue color visible to birds for reducing bird collisions.

In the coated article of any of the preceding six paragraphs, the UV reflecting coating may further comprises a third high index transparent dielectric layer provided on the first glass substrate over at least the second low index layer, and/or a third low index transparent dielectric layer provided on the first glass substrate over at least the third high index layer.

In the coated article of any of the preceding seven paragraphs, at least one of the first and second high index layers may comprise an oxide of Ti, that is doped with from about 1-20% (atomic %) Zr, Ce, and/or Nb with respect to metal content of the layer. For example, at least one of the first and second high index layers may have an oxygen rich stoichiometry and comprises an oxide of Ti, that is doped with from about 1-20% (atomic %) Zr with respect to metal content of the layer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An IG window unit for reducing bird collisions, comprising:
    a first glass substrate;
    a second glass substrate;
    wherein the first glass substrate is provided at an exterior side of the IG window unit so as to face an exterior of a building in which the IG window unit is to be mounted;
    a patterned reflecting coating provided on the first glass substrate and on an exterior surface of the IG window unit so as to face an exterior of a building in which the IG window unit is to be mounted;
    wherein the reflecting coating comprises, moving away from the first glass substrate:
    a first high index transparent dielectric layer;
    a first low index transparent dielectric layer;
    a second high index transparent dielectric layer;
    a second low index transparent dielectric layer; and
    wherein at least one of the first and second high index layers comprises an oxygen rich oxide comprising TiOx, wherein said at least one of the first and second high index layers, at a wavelength of 360 nm, has a "k" value less than 0.025 and/or a refractive index value (n) of at least 2.91;
    wherein the IG window unit, as viewed from the exterior thereof, has a reflectance of at least 30% at a wavelength of 380 nm for both a viewing angle of 8 degrees and a viewing angle of 45 degrees from normal.

2. The IG window unit of claim 1, wherein the IG window unit, as viewed from the exterior thereof, has a reflectance of at least 50% at a wavelength of 380 nm for both a viewing angle of 8 degrees and a viewing angle of 45 degrees from normal.

3. The IG window unit of claim 1, wherein the IG window unit, as viewed from the exterior thereof, has a reflectance of at least 60% at a wavelength of 380 nm for both a viewing angle of 8 degrees and a viewing angle of 45 degrees from normal.

4. The IG window unit of claim 1, wherein the IG window unit, as viewed from the exterior thereof, has a reflectance at a wavelength of 380 nm that does not vary by more than 30% between the viewing angle of 8 degrees and the viewing angle of 45 degrees.

5. The IG window unit of claim 1, wherein the reflecting coating blocks at least 50% of radiation incident on the reflecting coating, in at least a substantial part of a wavelength range from 330-380 nm.

6. The IG window unit of claim 1, wherein the first and second high index layers have a refractive index of from 2.15 to 2.7 (at 550 nm).

7. The IG window unit of claim 1, wherein the first and second high index layers have a refractive index of from 2.3 to 2.6 (at 550 nm).

8. The IG window unit of claim 1, wherein the first and second low index layers have a refractive index (n) of from 1.4 to 1.7 (at 550 nm).

9. The IG window unit of claim 1, wherein the first and second low index layers comprise an oxide of silicon, and may optionally further comprise nitrogen and/or aluminum.

10. The IG window unit of claim 1, wherein at least one of the first and second high index layers comprises an oxide of $TiO_x$ where x is at least 2.02.

11. The IG window unit of claim 1, wherein a low-E coating is provided on a side of the first substrate opposite the side at which the reflecting coating is provided.

12. The IG window unit of claim 1, wherein the reflecting coating does not contain any IR reflecting layer based on Ag or Au.

13. The IG window unit of claim 1, wherein the IG window unit further comprises a third glass substrate,
wherein the second glass substrate is provided between at least the first and third glass substrates;
wherein the third glass substrate is provided at an interior side of the IG window unit so as to face an interior of a building in which the IG window unit is to be mounted;
wherein the second glass substrate is laminated via a polymer inclusive laminating film to either the first glass substrate or the third glass substrate;
wherein the first glass substrate is located between the patterned reflecting coating and the polymer inclusive laminating film.

14. The IG window unit of claim 1, wherein at least one of the first and second high index layers comprises an oxide of Ti, that is doped with from about 1-20% (atomic %) Zr, Ce, and/or Nb with respect to metal content of the layer.

15. The IG window unit of claim 1, wherein at least one of the first and second high index layers has an oxygen rich stoichiometry and comprises an oxide of Ti, that is doped with from about 1-20% (atomic %) Zr with respect to metal content of the layer.

16. A window unit for reducing bird collisions, comprising:
a first glass substrate;
a patterned reflecting coating provided on the first glass substrate;
wherein the reflecting coating comprises, moving away from the first glass substrate:
a first high index transparent dielectric layer;
a first low index transparent dielectric layer;
a second high index transparent dielectric layer;
a second low index transparent dielectric layer; and
wherein at least one of the first and second high index layers comprises an oxygen rich oxide of TiOx and wherein said at least one of the first and second high index layers, at a wavelength of 360 nm, has a "k" value less than 0.025 and/or a refractive index value (n) of at least 2.91;
wherein the patterned reflecting coating causes the window unit to have a contrast ratio of at least 1.6 at each of 8 and 45 degree viewing angles at a wavelength of 380 nm.

17. A coated article for reducing bird collisions, comprising:
a first glass substrate;
a patterned reflecting coating provided on the first glass substrate;
wherein the reflecting coating comprises, moving away from the first glass substrate:
a first high index transparent dielectric layer;
a first low index transparent dielectric layer;
a second high index transparent dielectric layer;
a second low index transparent dielectric layer; and
wherein at least one of the first and second high index layers comprises an oxygen rich oxide of $TiO_x$ where x is from 2.02 to 2.20, and wherein said at least one of the first and second high index layers, at a wavelength of 360 nm, has a "k" value less than 0.025 and/or a refractive index value (n) of at least 2.91;
wherein the coated article, as viewed from an exterior thereof, has a reflectance of at least 30% at a wavelength of 380 nm for both a viewing angle of 8 degrees and a viewing angle of 45 degrees from normal.

* * * * *